United States Patent [19]

Mayr et al.

[11] Patent Number: 4,985,185
[45] Date of Patent: Jan. 15, 1991

[54] METHOD FOR MANUFACTURING AN OPTICAL CABLE

[75] Inventors: Ernst Mayr, Starnberg; Ulrich Oestreich, Munich, both of Fed. Rep. of Germany

[73] Assignee: Siemens Aktiengesellschaft, Berlin and Munich, Fed. Rep. of Germany

[21] Appl. No.: 321,795

[22] Filed: Mar. 10, 1989

[30] Foreign Application Priority Data

Mar. 10, 1988 [DE] Fed. Rep. of Germany ....... 3808037

[51] Int. Cl.$^5$ .............................................. B29D 11/00
[52] U.S. Cl. ...................................... 264/1.5; 156/48; 156/172; 427/163
[58] Field of Search ..................... 264/1.5; 350/96.23; 156/48, 172; 427/163

[56] References Cited

U.S. PATENT DOCUMENTS

| 4,199,224 | 4/1980 | Oestrich | 350/96.23 |
| 4,548,664 | 10/1985 | Canivet | 264/1.5 |
| 4,690,498 | 9/1987 | Priaroggia | 350/96.23 |

FOREIGN PATENT DOCUMENTS

| 11712 | 1/1986 | Japan | 264/1.5 |
| 2172544 | 9/1986 | United Kingdom | 264/1.5 |

Primary Examiner—James Lowe
Attorney, Agent, or Firm—Hill, Van Santen, Steadman & Simpson

[57] ABSTRACT

A method for manufacturing an optical cable includes simultaneously introducing a light waveguide and filling material into a chamber of a central element with the waveguide having an excess length. Preferably, the central element is moved axially and rotated on the axis and the light waveguide and filling material are passed through a tube which is inserted in the chamber as the central element is moved relative thereto.

10 Claims, 1 Drawing Sheet

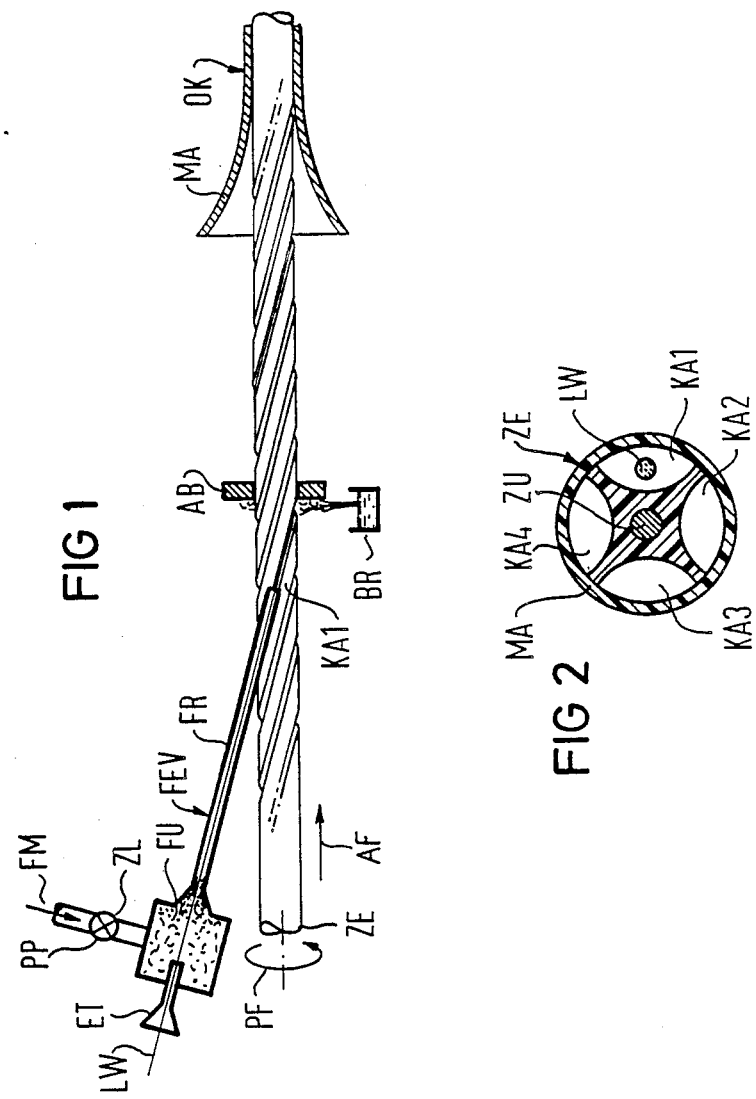

METHOD FOR MANUFACTURING AN OPTICAL CABLE

BACKGROUND OF THE INVENTION

The invention is directed to a method and apparatus for the manufacture of optical cables wherein at least one light waveguide is introduced with excess length into at least one chamber proceeding in the fashion of a helical line in a center element and a filling compound is introduced into the chamber.

U.S. Pat. No. 4,199,224, whose disclosure is incorporated by reference thereto and which claimed priority from German Application No. 24 49 439, discloses a method for providing light waveguides in a chambered cable. As disclosed, a core of the cable has outwardly opening chambers which receive light waveguides. The details concerning the manner by which the filling compound is introduced into the respective chambers is not set forth in this prior art reference. It is merely set forth that with respect to the light waveguides that these are to be introduced in a pushing fashion into the chambers provided for their acceptance.

German Patent No. 30 27 743 discloses a method wherein one or more light waveguides are loosely introduced into an outside protective sheath which is produced by an extruder. The light waveguides are conducted through a tube which is arranged after a constrained conveying means. The tube extends through a passage opening provided in the extruder which opening roughly exits the location of the extrusion head for the outer sheath A strain can be produced with hydraulic drag mechanism through which the light waveguide is moved with a filling compound flowing in the tube. The cables manufactured in accordance with this patent are of a design that is different fundamentally from those of the "chambered cables" because the light waveguide or light waveguides in the "chambered cables" are laid into outwardly opening chambers, whereas the light waveguides of this German patent are arranged loosely in a closed tubular protective sheath.

European Patent No. 0 132 446 discloses that haul-offs are provided in a chambered cable for the central element that contains the chambers The haul-off speeds of these haul-offs are matched to one another so that the central element is stretched between the two haul-offs during the insertion of the light waveguides and the degree of stretching is in the elastic region or range of the central element. An excess length for the light waveguides occurs due to the following spring back of the central element when the stretching forces are released U.S. Pat. No. 4,548,664, whose disclosure is incorporated herein by reference thereto and which claims priority from the same application as European Patent No. 0 132 827, discloses the chambers of a core proceeding in the fashion of a helical line and are completely filled with a viscous filling material in a separate operating cycle. As disclosed, the fibers are laid in the chambers and then wrapped loosely with a first tape which is provided with gaps between turns. This wrapped element is then passed through an injection device by which the filling material is injected through the gaps between the turns of the tape to fill each of the chambers and subsequently a second tape is wrapped on the element to close the gaps. The steps of insertion of the fibers and insertion of the filling compound are two separate steps as disclosed by this patent.

SUMMARY OF THE INVENTION

The object of the present invention is to execute the insertion of the light waveguides and the filling process in an optimally simple way and to simultaneously guarantee that the light waveguides are introduced in the chambers without a great outlay and in a gentle fashion. In accordance with this invention, this is achieved by a method which requires moving a core having a chamber, and then inserting the fiber and filling compound simultaneously in one working step into this chamber.

The two separate work steps are thus no longer required for the introduction of the filling compound on the one hand and for the introduction of the light waveguide on the other hand. Instead, both are carried out in common. With respect to the light waveguide, this additionally has the advantage that they can be introduced into the respective chambers in an especially gentle way because the light waveguides are already embedded in the filling compound during the filling and introduction step and this practically completely eliminates the mechanical stressing of the light waveguide during the introduction step. The filling compound itself is thus simultaneously used as a soft cushioning guidance for the light waveguide.

The invention is also directed to an apparatus for the implementation of the method set forth above. This apparatus is characterized in that the filling and introduction means is provided that comprises a common guide tube for both the light waveguide and the filling compound Other advantages and features of the invention will be readily apparent from the following description of the preferred embodiments, the drawings and claims.

BRIEF DESCRIPTION OF THE DRAWINGS

FIG. 1 is a side view of a filling and introduction apparatus for the method in accordance to the present invention; and FIG. 2 is a cross-sectional view of an article manufactured in accordance with the present invention.

DESCRIPTION OF THE PREFERRED EMBODIMENTS

The principles of the present invention are particularly useful for manufacturing an optical cable generally indicated at OK in FIG. 1. As illustrated in FIGS. 1 and 2, the cable OK has a central element ZE which has four chambers KA1, KA2, KA3 and KA4 that proceed in the fashion of a helical line and receive a light waveguide LW. These chambers are formed in the central element ZE which comprises a web or ridges that proceed essentially radial or outward so that the chambers are outwardly opening chambers. After the introduction of the light waveguide LW and of the filling compound, these chambers are terminated or closed on the outside by an outside cladding or sheath such as MA which also may include armoring if desired. The central element ZE also has a tensile core part ZU which is preferably composed of either a single steel wire or a bundle of steel wires.

The method utilizes an apparatus which has means for advancing the core or central element ZE in an axial direction from left to right as illustrated in FIG. 1 and in the direction of the arrow AF. Preferably, the means also rotates the central element in the direction of arrow PF which is around a longitudinal axis of the element at least during the step of inserting the light waveguide and the filling compound into each of the chambers In FIG. 1, only the arrangement for providing a light waveguide in the chamber KA1 is illustrated. However, the filling of the remaining chambers KA2-KA4 occurs in the same fashion.

For simplification, the filling or introduction event shall be described as though only a single light waveguide were introduced into the chamber KA1. However, it should be noted that the light waveguide LW can represent a plurality of light waveguides, a light waveguide bundle or even a ribbon-shaped light waveguide structure or the like which can be introduced instead of a single light waveguide.

The light waveguide LW is introduced into a delivery funnel ET which has an inside diameter that is tapered with the smallest part being only slightly larger than the outside diameter of the light waveguide LW. The light waveguide LW is taken from a delivery reel by a conventional arrangement which is not illustrated and proceeds through the funnel ET into a filling space FU which receives a soft, preferably thixotropic filling compound FM from a delivery conduit ZL. The delivery of the filling compound FM occurs under pressure which is provided by a pump PP. The pressure of the filling compound in the filling space FU entrains the light waveguide LW to move therewith so that the light waveguide flowing in the filling compound will experience an all around embedding in the filling compound so that an especially gentle displacement of the light waveguide LW in a direction towards the chamber KA1 will occur. The inside diameter of the filling tube FR is selected to be at least such a size that the chamber KA1 is completely filled with the filling compound and of course with the entrained light waveguide LW. The cross-section of the filling tube FR can be smaller than that of the chamber KA1 because the filling compound FM is moving faster than the longitudinal movement of the chamber KA and the movement of the waveguide LW. The end of the guide tube FR discharges approximately tangentially into the chamber KA which extends in a helical fashion. It is thereby expedient when the exit opening of the filling tube FR still lies between the side legs or walls of the chamber opening, i.e., is guided therein. This prevents the filling compound FM and the light waveguide LW contained therein from transversing free regions before they experience a new lateral guidance due to the chamber walls of the chamber KA1. The filling compound FM expediently flows faster than the light waveguide LW and exerts a tension force on the waveguide in this way. The filling compound speed, i.e., is accomplished by regulating the rpm's of the pump PP, and thus makes it possible to set the necessary excess fiber length of the light waveguide in the finished chamber in a simple manner. A pre-stretching of the central element ZE is thus not necessary and with the elimination of the prestretching, this provides particular advantages because of the saving in costs during the method of manufacture. Any potential excess filling compound can be removed by a calibrated stripping element AB which has a corresponding through aperture and will strip the excess material to be collected in a container BR for re-use.

The closing of the chambers after the insertion of the light waveguides can occur with a thin plastic layer MA compatible with the filling compound that is simultaneously injection molded in a hose-stretching method. This plastic layer MA holds the filling compound and the light waveguide in place after it cools. However, it is also possible to effect closure of the chamber towards the outside with a taping machine or the like. The insertion of the light waveguides and the delivery of the filling compound should optimally occur immediately before the application of a plastic cladding MA and/or of the winding or covering Tensile elements, armorings and other further outside cladding can be applied onto the optical cable OK in a known way in further work cycles if desired.

Although various minor modifications may be suggested by those versed in the art, it should be understood that we wish to embody within the scope of the patent granted hereon all such modifications which reasonably and properly come within the scope of our contribution to the art.

We claim:

1. A method for manufacturing optical cables having a central element with at least one open chamber receiving at least one light waveguide having an excess length and a filling compound, said method comprising the steps of providing the central element having the open chamber, and simultaneously introducing the light waveguide with a filling compound into the chamber in a single step including guiding the waveguide and filling compound through a common filling tube to be discharged from an end of the tube into the open chamber.

2. A method according to claim 1, which includes subsequent to introducing the fiber and filling compound into the chamber, closing the chamber by simultaneously extruding a cladding layer thereon.

3. A method according to claim 1, wherein the step of providing includes moving the central element axially and rotating the element on its axis as the step of simultaneous filling the introducing occurs.

4. A method according to claim 3, which includes the step of stripping excess filling compound from the central element.

5. A method according to claim 4, which includes after the step of stripping, closing the chamber by extruding a cladding layer thereon.

6. A method according to claim 3, wherein the step of introducing the filling compound and the light waveguide includes introducing the filling compound faster than the longitudinal movement of the corresponding chamber of the central element.

7. A method according to claim 1, wherien the step of introducing includes positioning the common filling tube with the discharge end projecting into the respective chamber.

8. A method according to claim 7, wherein the filling tube has a cross-section that roughly corresponds to that of the chamber.

9. A method according to claim 1, wherein the step of providing the central element provides an element with a plurality of chambers, and the step of introducing includes providing a separate filling tube with a discharge end for each chamber and guiding waveguides and filling compound through the filling tubes to be discharged from the discharge ends into each chamber of the plurality of chambers.

10. A method according to claim 1, wherein the step of providing includes moving the central element axially and rotating the central element on its axis relative to the filling tube which is held in a fixed position.

* * * * *